United States Patent
Froehlich

(10) Patent No.: US 6,263,753 B1
(45) Date of Patent: Jul. 24, 2001

(54) CONTROL DEVICE FOR MOTOR VEHICLE STEERING, BRAKE AND ACCELERATOR

(76) Inventor: Juan Froehlich, 124 Cottage Ave., Albany, NY (US) 12203

( * ) Notice: Subject to any disclaimer, the term of this patent is extended or adjusted under 35 U.S.C. 154(b) by 0 days.

(21) Appl. No.: 09/449,460

(22) Filed: Nov. 27, 1999

(51) Int. Cl.⁷ .............................. G05G 11/00; B60K 26/00
(52) U.S. Cl. .............................. 74/482; 74/481; 74/486; 180/333
(58) Field of Search .............................. 74/481, 482, 486; 180/333

(56) References Cited

U.S. PATENT DOCUMENTS

| | | | |
|---|---|---|---|
| 1,556,302 | * 10/1925 | Pace | 74/486 |
| 1,841,294 | * 1/1932 | Nicholson | 74/486 |
| 2,200,625 | * 5/1940 | Koppel | 74/486 X |
| 2,470,273 | * 5/1949 | Uffel | 74/486 |
| 2,648,993 | * 8/1953 | Kemp | 74/486 |
| 4,078,628 | 3/1978 | Reichenberger | 180/77 |
| 4,476,954 | 10/1984 | Johnson et al. | 180/333 |
| 4,788,879 | 12/1988 | Ulrich | 74/481 |
| 4,998,983 | 3/1991 | Ruprecht et al. | 192/152 |
| 5,129,492 | 7/1992 | Lenz et al. | 74/481 |
| 5,553,684 | 9/1996 | Bolduc | 180/333 |
| 5,603,674 | 2/1997 | Rivas et al. | 477/710 |
| 5,662,002 | 9/1997 | Venturini | 74/484 |
| 5,666,857 | 9/1997 | Sebazco | 74/481 |

* cited by examiner

Primary Examiner—Allan D. Herrmann
(74) Attorney, Agent, or Firm—Charles A. Taylor

(57) ABSTRACT

A control device for vehicle steering, braking and accelerator, including but not limited to motor vehicles for use by handicapped drivers, especially those handicapped in the lower limbs, is provided. The control device relates to a system utilizing the steering wheel to accomplish both steering and braking and an accelerator lever device to control the accelerator operations of the vehicle. Specifically, the present invention relates to a system wherein the steering is accomplished in a normal manner by the driver, but the driver need only push forward on the steering wheel to accomplish the braking operations or move a lever device to control the speed of the vehicle. The control device for vehicle steering, braking and accelerator may be employed in any vehicle, including but not limited to motor vehicles, with a mechanical or an automatic gear box.

12 Claims, 10 Drawing Sheets

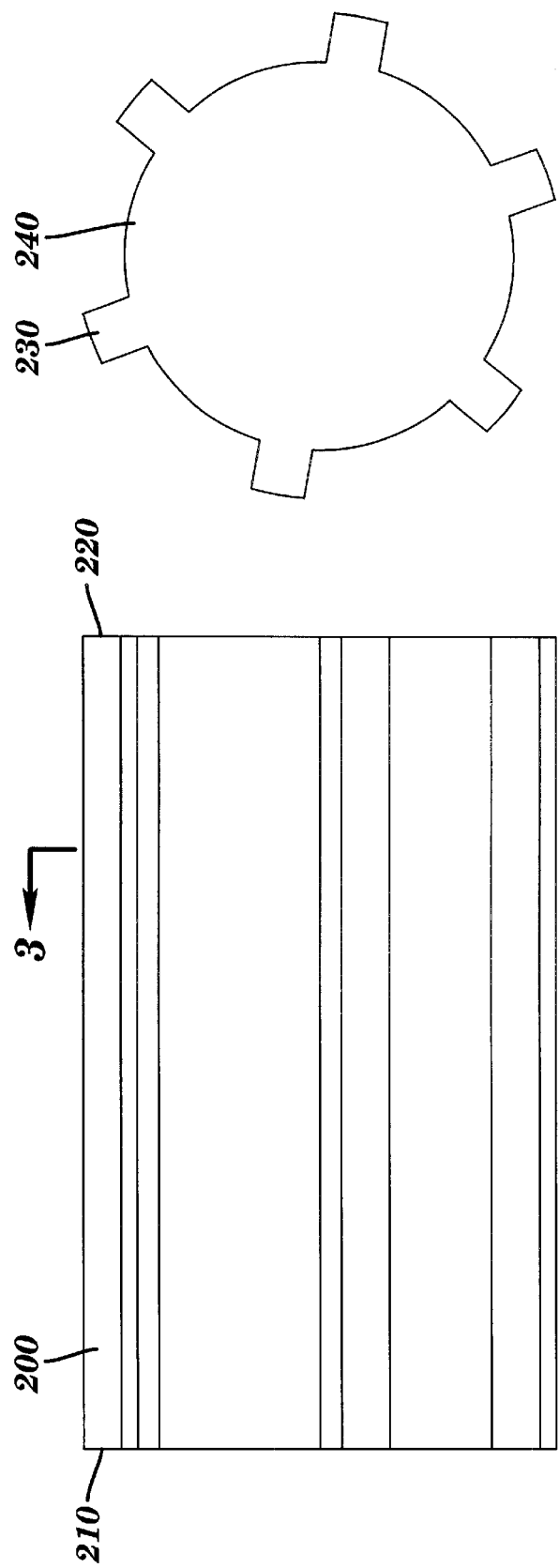

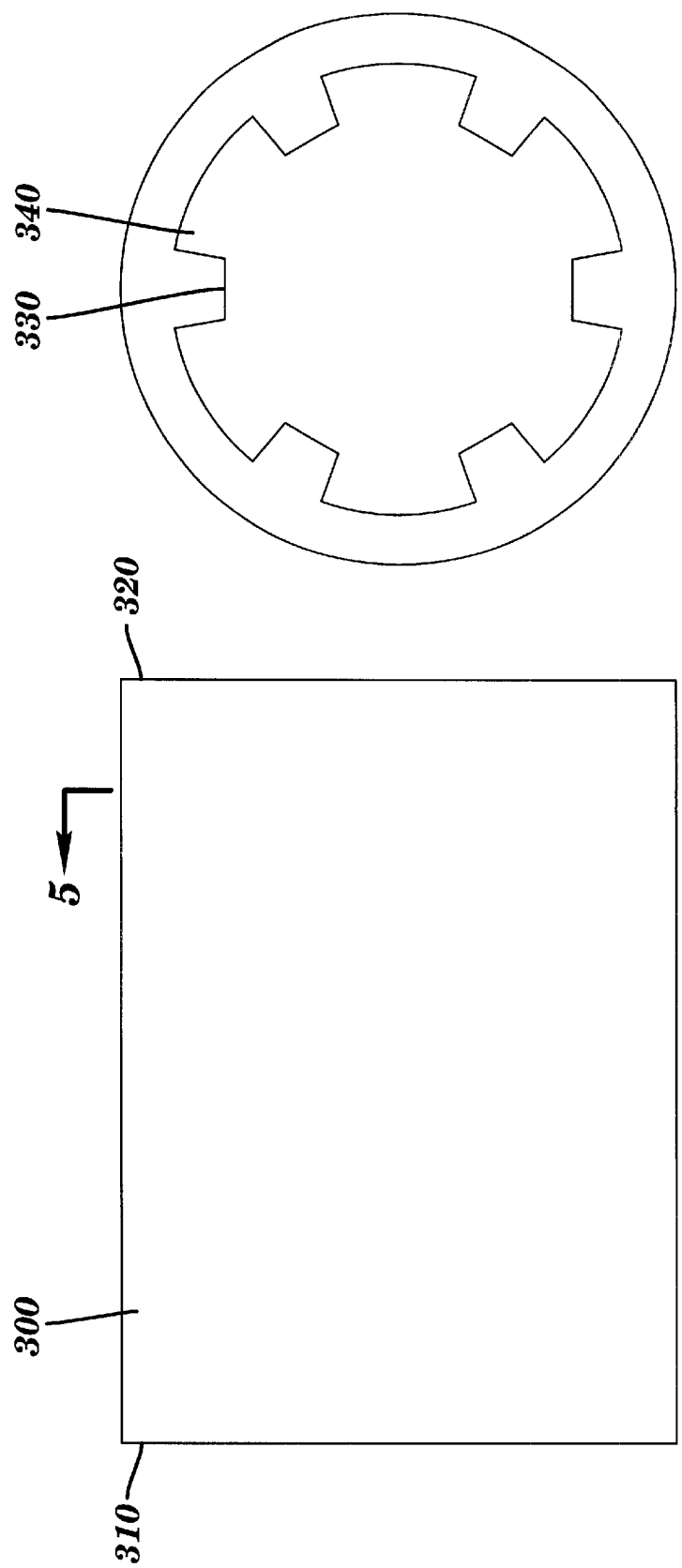

CONTROL DEVICE FOR MOTOR VEHICLE STEERING, BRAKE AND ACCELERATOR

BACKGROUND OF THE INVENTION

1. Field of the Invention

The invention relates to a control device for operating the brake and accelerator pedals for a vehicle having either a manual transmission or an automatic transmission, including but not limited to motor vehicles, by handicapped drivers who have lost the functional mobility of the

2. Description of the Related Art

Conventional vehicles incorporate foot controls, a typical vehicle with an automatic transmission having accelerator and brake pedals and a manual transmission having accelerator, brake and clutch pedals. To permit operation by handicapped persons having restricted or no use of their legs, such vehicles may be fitted with hand controls which permit hand operation of the accelerator and brake pedals. Handicapped persons are normally restricted to the use of automatic transmission vehicles.

The majority of hand controls which have been considered previously utilize systems of levers and push rods of varying complexity, and are installed in the vehicle in various ways.

Sebazco's U.S. Pat. No. 5,666,857 discloses a steering and braking control system. This invention provides a means to brake a car without use of the brake pedal by pushing the steering wheel to activate the brake and releasing it to release the brake. Venturini's U.S. Pat. No. 5,662,002 discloses a control device mounted within the steering wheel for control of acceleration and braking. This device uses a series of lever elements connected to a cable system which activates electrical controls for control of the automobile.

U.S. Pat. No. 5,603,674 by Rivas discloses a set of vehicle controls for brake, clutch and accelerator pedals. An accelerator and brake control is mounted on the steering wheel and a brake and clutch control is mounted on the gear shift level. Signals are transmitted electrically from the control to a motor with a wire-free connection to operate the pedal. Bolduc's U.S. Pat. No. 5,553,684 discloses a system for the operating of the brake and accelerator pedals using a single joystick. A signal is electrically transmitted to mechanical components which operate the respective pedals.

Lenz's U.S. Pat. No. 5,129,492 demonstrates a hand lever control device mounted on the steering column, which controls the acceleration and braking systems. Likewise Ruprecht's U.S. Pat. No. 4,998,983 discloses a lever system which activates the brake and accelerator pedals. The lever is attached to the steering column. Ruprecht's U.S. Pat. No. 4,788,879 also discloses a lever system to operate the brake and accelerator pedals.

U.S. Pat. No. 4,790,177 by Johnson discloses a remote controller steering, braking and accelerating. The invention incorporates a two axis joystick which is the connected to the steering wheel, and brake and accelerator through electric motors. Reichenberger's U.S. Pat. No. 4,078,628 discloses a double wheel control system for controlling brake and accelerator.

SUMMARY

The object of the present invention is a control device for vehicle steering, braking and accelerator for the assistance of handicapped drivers in driving vehicles, especially drivers handicapped in the lower limbs. The present invention provides a control device for vehicle, steering, braking and accelerator that is readily accepted by all users and leads to enhanced driver handling capability. The present invention is for any vehicle, including but not limited to motor vehicles.

The control device for vehicle steering, braking and acceleration comprises a steering wheel, a steering mechanism, a braking mechanism and an accelerator mechanism. The steering mechanism has a spline shaft connected to the vehicle steering shaft, a spline bearing, an inner ring on a ring assembly and a steering wheel, whereby rotation of the steering wheel is transferred through the inner ring to the spline bearing, then to the spline shaft and finally to the steering shaft. The braking mechanism has a control rod attached to the vehicle brake pedal, a bearing cap and a brake bearing means attached to the control rod. The brake bearing means is in contact with the outer ring of the ring assembly whereby when a force is exerted on the steering wheel, the steering wheel then exerts a force on the ring assembly and thereby on the outer ring which, in turn exerts the force against the brake bearing means, the bearing cap and the control rod thereby moving the brake pedal and causing the braking system to arrest the motion of the vehicle.

In a second embodiment of the invention, an accelerator control lever device is mounted on the outer ring of the ring assembly and attached to the accelerator pedal through a control cable, whereby movement of the accelerator lever device moves the control cable and the accelerator pedal to change the speed of the vehicle.

Another object of the invention is to provide a device which is modular and can therefore be used in any vehicle with either a mechanical or an automatic gear box.

Yet another object of the invention is to provide a device which allows the handicapped user to experience sensations identical to those of driving a normal vehicle. The invention also aims to provide a device that allows all the flexibility and performance of the vehicle to be maintained, and which enables normal driving with pedals by a non-handicapped person.

Other characteristics and advantages of the invention will become apparent upon reading the following description of an embodiment of the invention, provided as a non-limiting example and illustrated by the attached drawings wherein:

DRAWING DESCRIPTION

FIG. 2 is a perspective side view illustrating an embodiment a spline shaft used in the present invention.

FIG. 3 is a view, taken along line 3—3 of FIG.2, illustrating the spline shaft used in the present invention.

FIG. 4 is a view illustrating an embodiment of a spline bearing used in the present invention.

FIG. 5 is a view, taken along line 5—5 of FIG. 4, illustrating the spline bearing used in the present invention.

DETAILED DESCRIPTION

Figure 1:
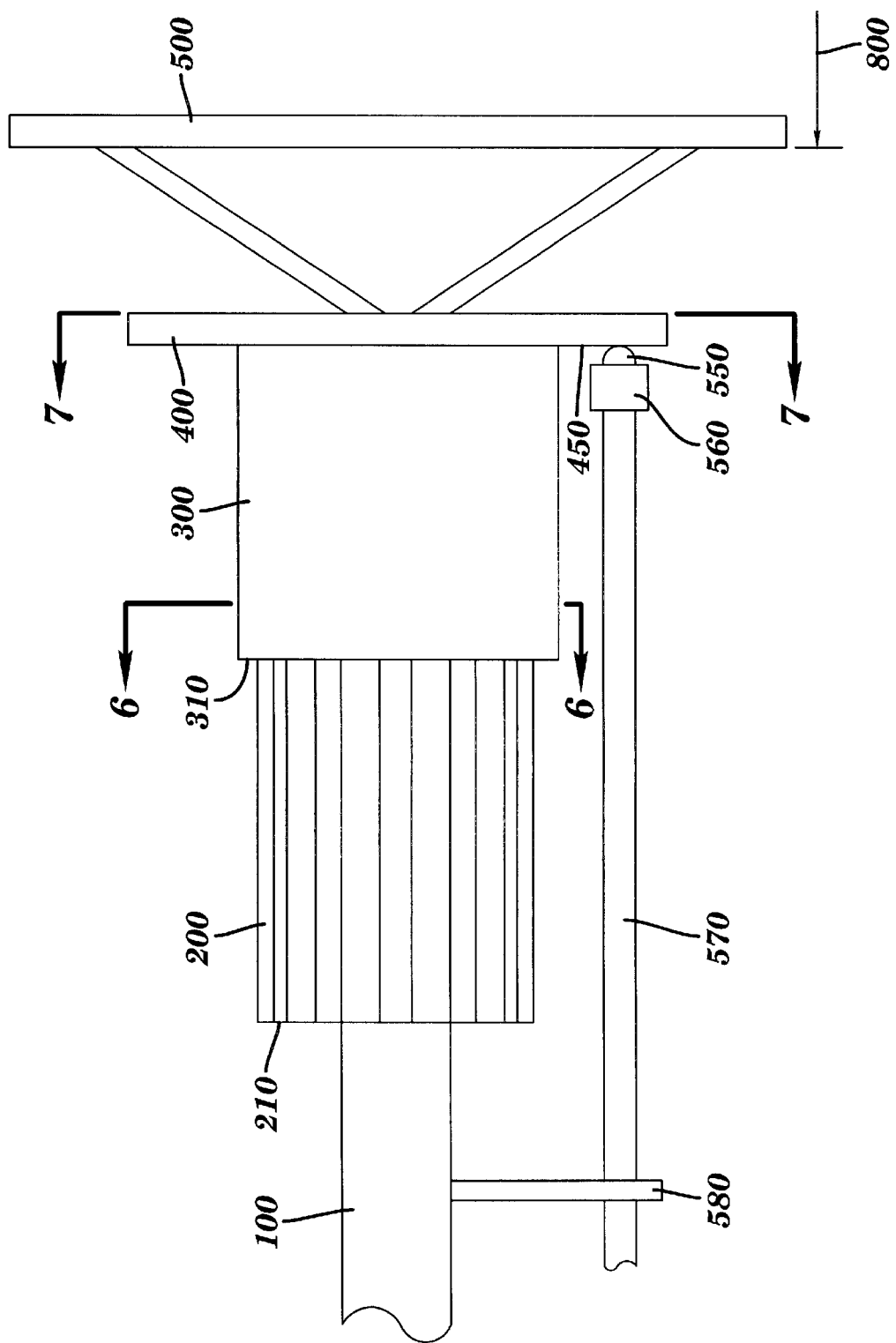
FIG. 1 is a perspective partial side view showing the control device in accordance with the present invention in assembled position in a vehicle for the control of a brake pedal according to a first embodiment of the present invention.

Referring to the drawings the same reference numbers illustrate the same elements throughout. FIG. 1, is a partial side view illustrating a first embodiment of the control device 10 according to the present invention for the control of the braking system. FIG. 1 does not illustrate the embodiment of the control device for use for acceleration. The control device comprises a spline shaft 200 wherein said spline shaft 200 is integral at said bottom end 210 with a vehicle steering shaft 100. In an alternative embodiment said bottom end 210 of said spline shaft 200 is coupled to a vehicle steering shaft 100 by a shaft connector means including but not limited to a threaded connection. Further, said spline shaft 200 is removably inserted into a first end 310 of spline bearing 300, whereby said spline bearing 300 may move in an axial direction along said spline shaft 200. And still farther said spline bearing 300 is restricted to movement between the top end 220 of said spline shaft 200, not shown in FIG. 1, and said bottom end 210 of said spline shaft 200 by any appropriate means. Said top end 320 of said spline bearing 300 being fit into said ring assembly 400. A steering wheel 500 is attached to said ring assembly 400 by appropriate connector means including, but not limited to bolts. Further brake bearing means 550 is in contact with said the bottom surface 450 of said ring assembly 400. Said brake bearing means 550 is attached to control rod 570 by means of bearing cap 560. Said brake bearing means 550 includes, but is not limited to a ball bearing. Said control rod 570 passing through at least one support guiding bracket 580 and further attached by appropriate means to the vehicle brake pedal (not shown). The brake pedal is connected to the vehicle brake system (not shown). Movement of the steering wheel 500 and said ring assembly 400 in a direction 800 along the axis of said control device 10 results in movement of the vehicle brake pedal and operation of the vehicle brake system.

The operational functions of the control device 10 is solely performed by a driver's use of a steering wheel 500, and in particular, without the use of the driver's feet to provide for the braking operation. FIG. 1 also illustrates that the rotation of the steering wheel 500, as will be further described, does not affect the brake system of the vehicle in which the first embodiment of the control device for steering and braking 10 is used.

The driver uses the steering wheel 500 to perform the steering functions in a normal manner, and when it is desired to brake the vehicle, the driver need only exert a force on the same steering wheel 500 to cause the ring assembly 400, coacting with the brake bearing means 550, the bearing cap 560 and the control rod 570 to be pressed in the same direction which, in turn, and conversely, causes the brake pedal (not shown) to be pressed downward, thereby, arresting the motion of the vehicle by means of the vehicle's braking mechanism (not shown).

Furthermore, the terminology "central region," "central portion," or "intermediate portion," is used herein in an interchangeable manner and all such usages are meant to correspond to the intermediate location between the first and second ends of a structural element of the present invention, such as spline shaft 200 or spline bearing 300.

FIG. 2 illustrates a perspective side view of said spline shaft 200 used in the present invention, wherein said spline shaft 200 has a bottom end 210 and a top end 220. As further shown in FIG. 3, said spline shaft 200 has at least one outer spline tooth 230 and at least one outer spline groove 240.

As further illustrated in FIG. 4, a perspective side view, said spline bearing 300 used in the present invention, wherein said spline bearing 300 has a first end 310 and a second end 320. As further shown in FIG. 5, said spline bearing 300 has at least on inner spline tooth 330 and at least one inner spline groove 340.

Figure 6:
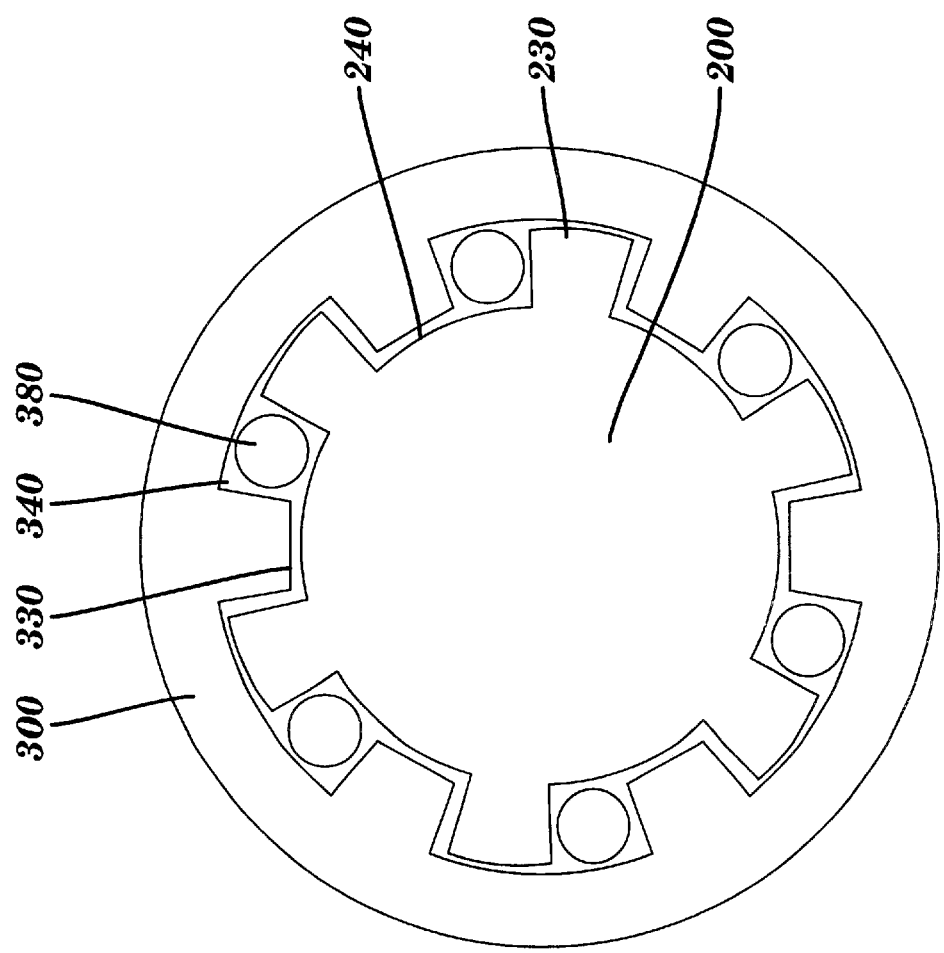
FIG. 6 is a view, taken along line 6—6 of FIG. 1 illustrating the spline shaft assembled within the spline bearing as used in the present invention.

As illustrated in FIG. 6, said spline shaft 200 is inserted into said spline bearing 300, whereby said at least one outer spline tooth 230 of said spline shaft 200 fits into said at least one inner spline groove 340 of said spline bearing 300. And further said at least one outer spline tooth 330 of said spline bearing 300 fits into said at least one outer spline groove 240 of said spline shaft 200. And still further that at least one friction reducing means 380 is inserted between said at least one outer spline tooth 230 of said spline shaft 200 and said at least one inner spline tooth 330 of said spline bearing 300 to allow movement of said spline bearing 300 axially along said spline shaft 200. Further rotation of said spline bearing 300 about its midpoint will transmit a corresponding rotation of the spline shaft 200 about its common midpoint.

Figure 7:
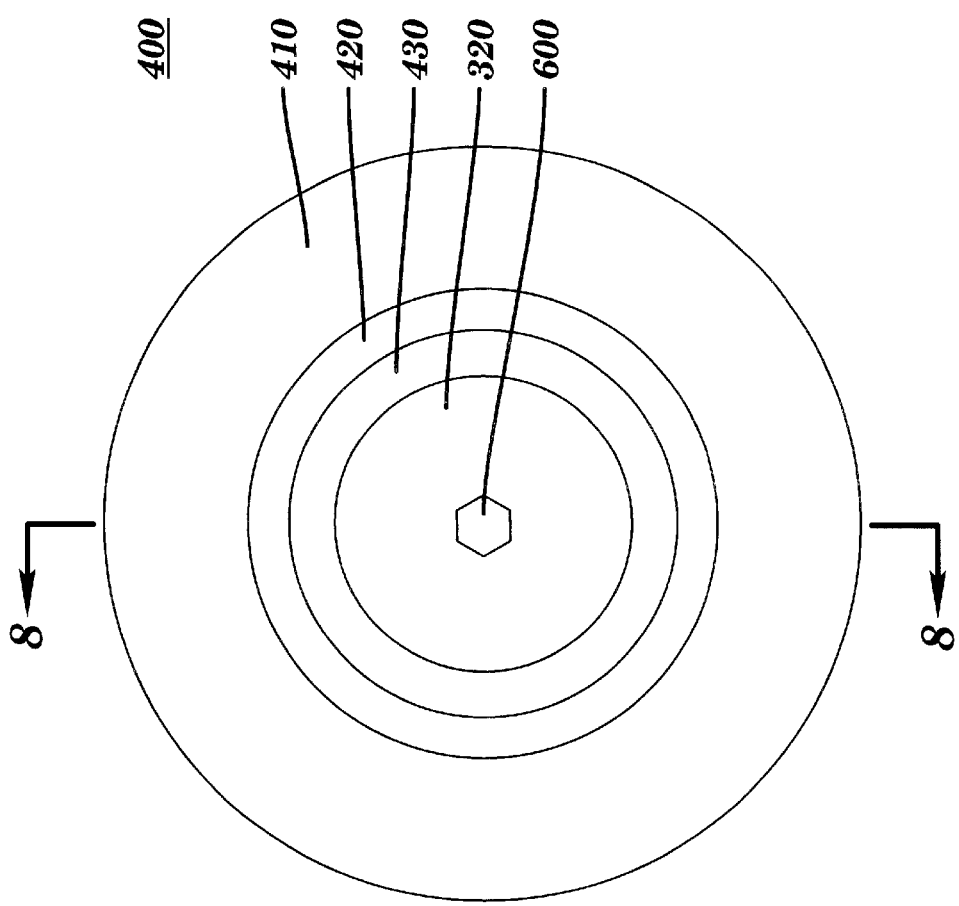
FIG. 7 is a view, taken along line 7—7 of FIG. 1, illustrating a ring assembly used in the first embodiment of the present invention.

As represented in FIG. 7, said ring assembly 400 is used in the first embodiment of the present invention. Said ring assembly 400 is comprised of a ring assembly connector means 600, said second end 320 of said spline bearing 300, a spacer ring 430, a ring assembly bearing 420 and an outer ring 410. Said second end 320 of said splinebearing 300, said spacer ring 430, said ring assembly bearing 420 and said outer ring 410 are press fit together to form said ring assembly 400 or are united by any appropriate means. Said ring assembly bearing 420 allows said spacer ring 430, and said spline bearing 300 to be rotated about the midpoint of said ring assembly 400 while allowing said out ring 410 to be held stationary or alternatively to move independently of said spacer ring 430 and said spline bearing 300. Said steering wheel (not shown) is attached by any appropriate means, such as bolting, to said spacer ring 430 whereby rotation of said steering wheel (not shown) about the midpoint of said ring assembly 400, results in rotation of said spacer ring 430 and said spline bearing 300.

Figure 8:
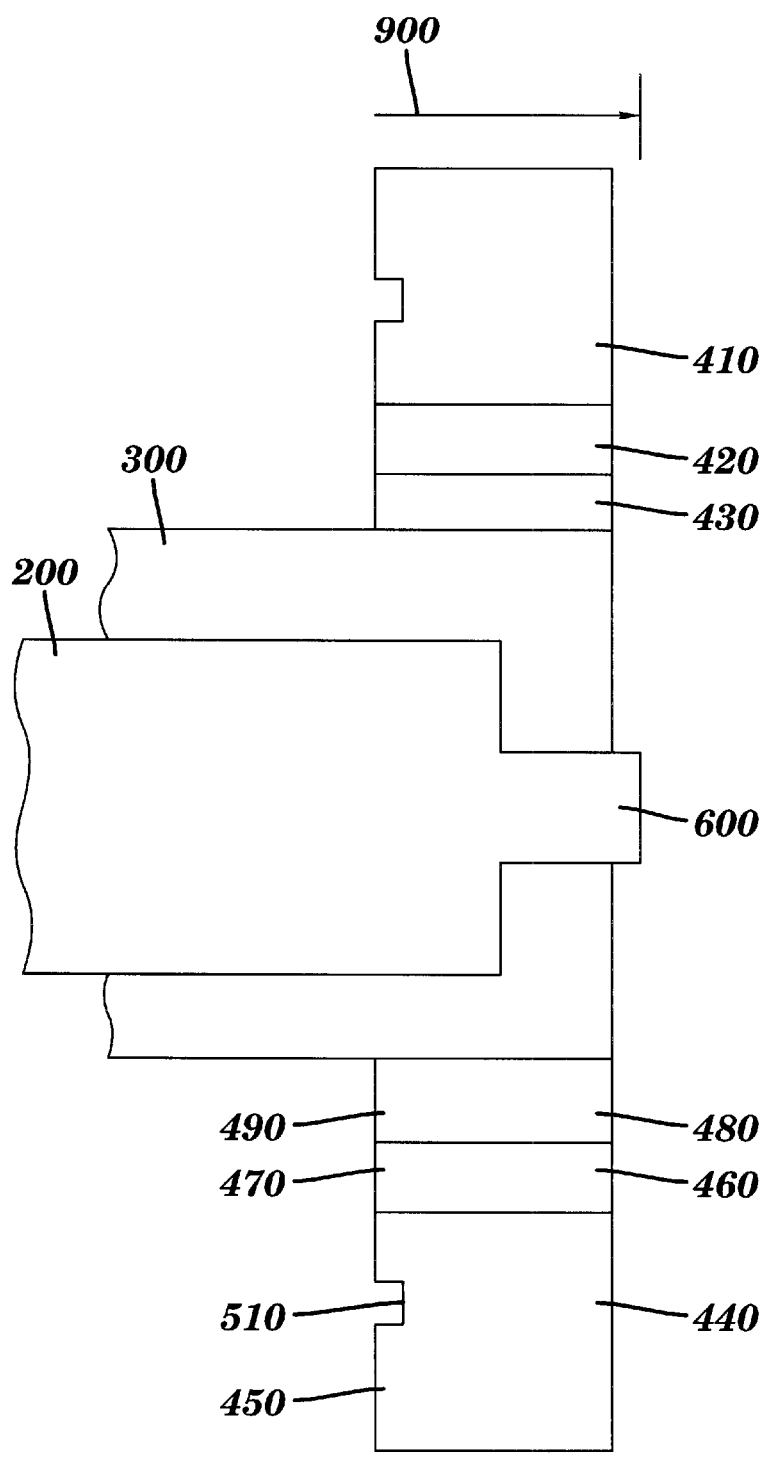
FIG. 8 is a view, taken along line 8—8 of FIG. 7, illustrating the ring assembly used in the present invention

As further represented in FIG. 8, said spacer ring 430 of said ring assembly 400 has an upper surface 480 and a bottom surface 490, said ring assembly bearing 420 of said ring assembly 400 has an upper surface 460 and a lower surface 470, and said outer ring 410 of said ring assembly 400 has an upper surface 440 and a lower surface 450. As further illustrated in FIG. 8, said ring assembly connector means 600 restricts the movement of said ring assembly 400 and said spline bearing 300 in direction 900. And as still further illustrated in FIG. 8, in an alternative embodiment, said lower surface 450 of said outer ring 410 has a groove 510 for receiving said brake bearing means 550.

Figure 9:
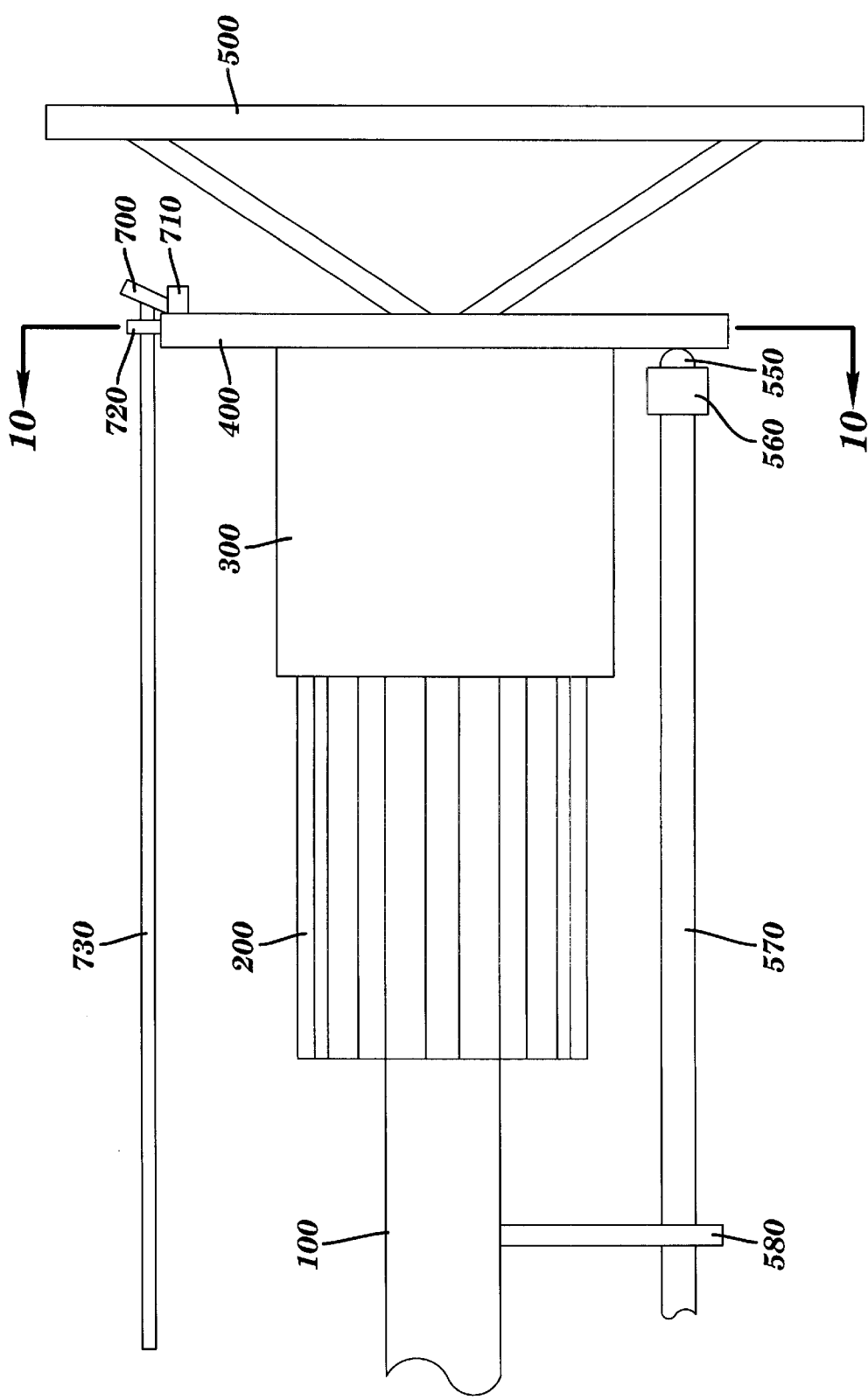
FIG. 9 is a perspective partial side view showing the control device in accordance with the present invention in assembled position in a vehicle for the control of a brake pedal and an accelerator pedal according to a second embodiment of the present invention.

As shown in FIG. 9, in a second embodiment of the control device for vehicle steering, braking and accelerator 20 of the present invention, an accelerator lever device 700, a lever device connector means 710 and a lever device cable guide 720, are attached by any appropriate means to said outer ring 410 of said ring assembly 400. As further shown in FIG. 9, said accelerator lever device 700 is connected to an accelerator control cable 730 which is then connected by any appropriate means to the vehicle accelerator pedal (not shown). Thereby movement of said accelerator lever device 700 causes a movement in the vehicle accelerator pedal (not shown).

Figure 10:
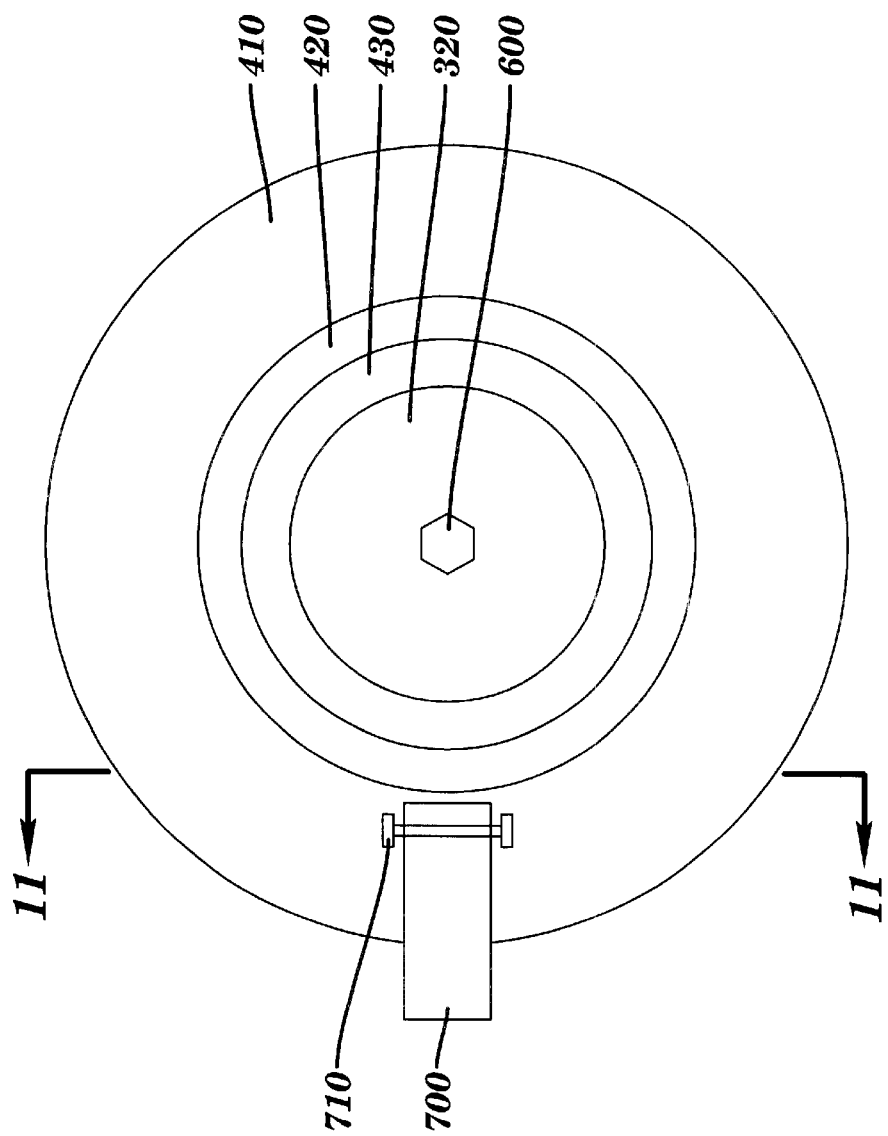
FIG. 10 is a view, taken along line 10—10 of FIG. 9, illustrating the placement of an accelerator lever device on a ring assembly according to the second embodiment of the present invention.

FIG. 10 demonstrates one embodiment of said acceleration lever device 700 and said lever device connector means to said outer ring 410 of said ring assembly 400.

Figure 11:
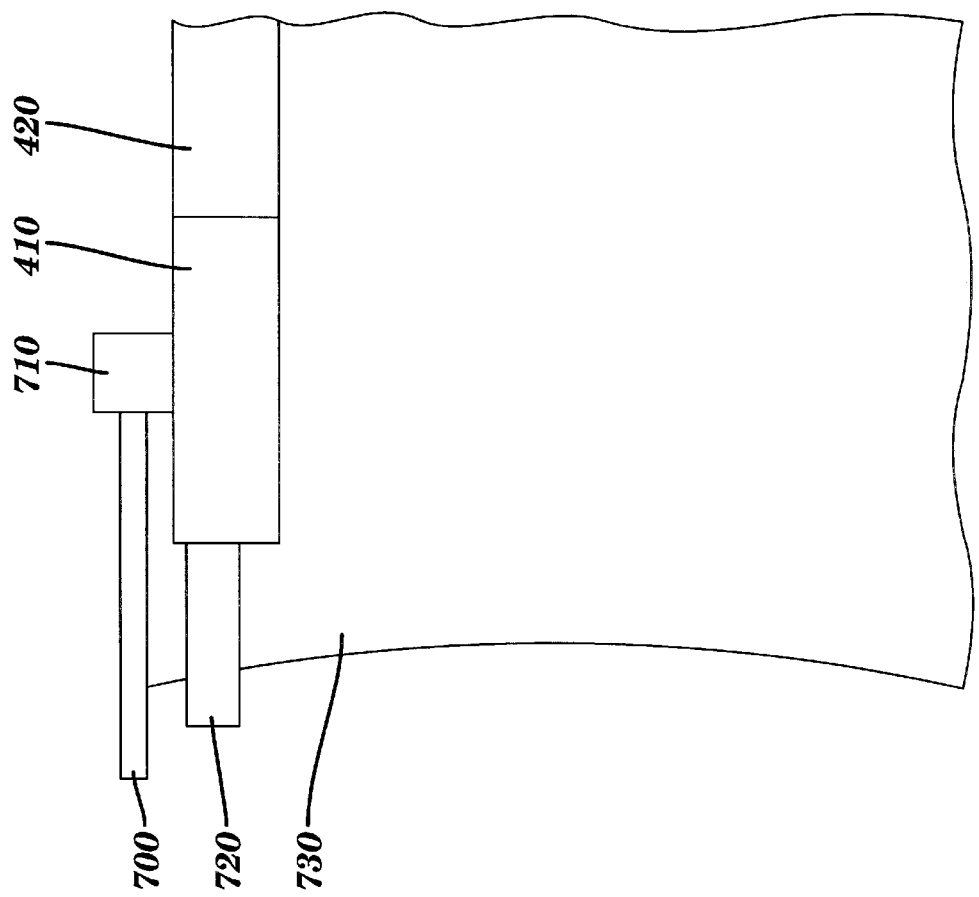
FIG. 11 is a view, taken along line 11—11 of FIG 10, illustrating an accelerator lever device to control an accelerator according to the second embodiment of the present invention.

As illustrated in FIG. 11, said accelerator control cable 730 is connected by any appropriate means to said accelerator lever device 700 and further said accelerator control cable 730. passes through said lever device cable guide 720.

Figure 12:
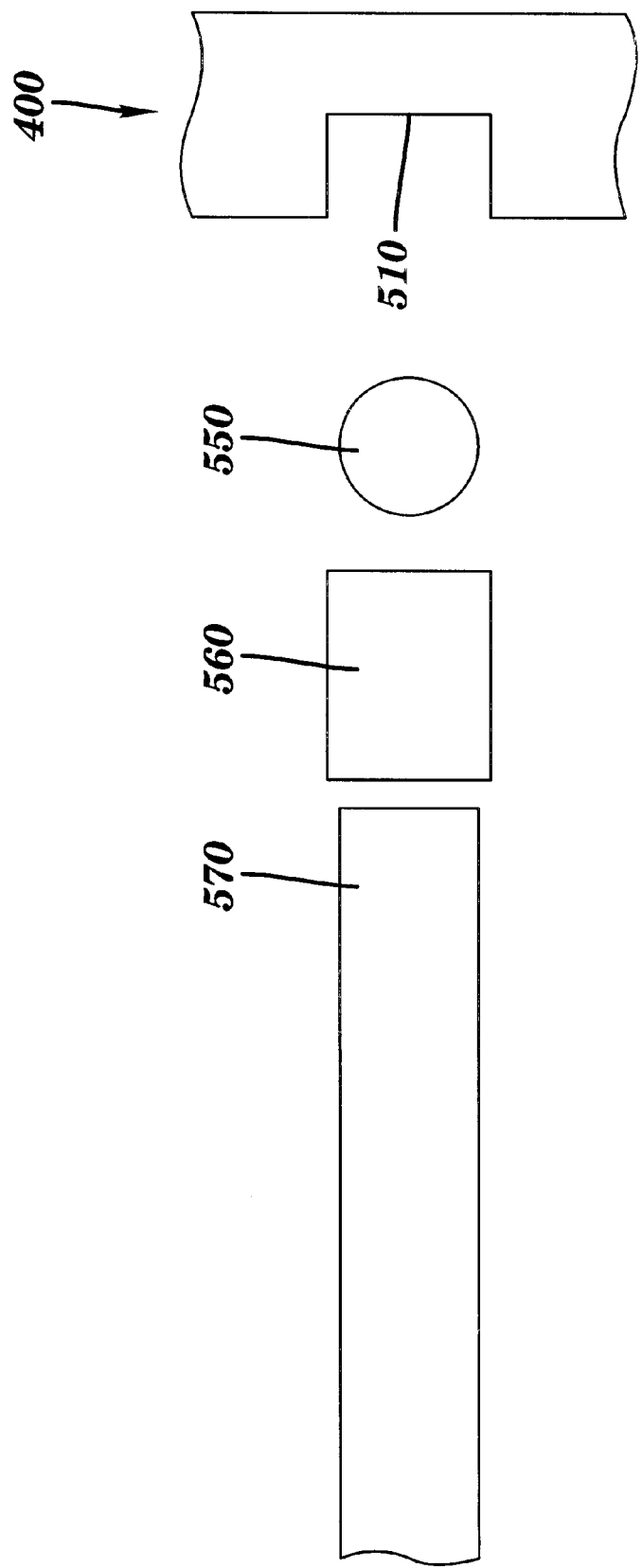
FIG. 12 is an exploded view of the brake bearing means.

As illustrated in FIG. 12, said bearing means 550 is a ball bearing. Said brake bearing means is attached to control rod 570 by means of bearing cap 550.

OPERATION OF THE CONTROL DEVICE FOR VEHICLE STEERING, BRAKING AND ACCELERATOR

In operation, the steering of the vehicle is accomplished in the normal manner by the driver using the steering wheel 500. However, in accordance with the first embodiment of the present invention, if the driver desires to stop the vehicle, the driver need only apply a downward force, in a forward direction relative to the driver, on the steering wheel 500. The use of the steering wheel 500 combined with the elements of the steering and braking device 10 provide a force to the brake pedal (not shown) with minimum of effort on the part of the driver. The downward force applied by the driver causes the steering wheel 500 to move. from its original position downward. The downward movement of the steering wheel 500 is shown by the directional arrow 800. The downward force exerted on the steering wheel 500 causes the ring assembly 400 to exert a downward force on the brake bearing means 550, the bearing cap 560 and the control rod 570 which, in turn, exerts a force on the vehicle brake pedal (not shown), thereby causing the braking mechanism (not shown) to arrest the motion of the vehicle. In an alternative embodiment said brake bearing means is confined by any appropriate means within groove 510.

Further when the driver reduces or releases the downward force on the steering wheel. 500, the brake pedal (not shown) returns to its normal position, which, in turn, returns the control rod 570, the bearing cap 560 and the brake bearing means 550 to its normal position and further the ring assembly 400 and the steering wheel 500 to their normal position. The ring assembly 400 comprises the outer ring 410, the ring assembly bearing means 420, the inner ring 430, the second end 320 of the spline bearing 300 and the ring assembly connector means 600. The ring assembly bearing means 420 allows the outer ring 410 to remain stationary or to move independently of the inner ring 430.

Steering of the vehicle is accomplished by rotation of the steering wheel 500 about its midpoint which, in turn, exerts a rotational movement of the ring assembly 400 through the wheel connector means (not shown). Rotation of the ring assembly, in turn, rotates the spline bearing 300, which, in turn, rotates the spline shaft 200 and in turn the steering shaft 100.

It should now be appreciated that the practice the first embodiment of the present invention provides for a control device for vehicle steering and braking 10 that not only serves as a steering control device but also, by simply exerting a force on the steering wheel, allows the driver of the vehicle to control the braking action of the vehicle.

In the second embodiment of the present invention, steering and braking are accomplished as described above. In addition, an accelerator lever device 700 is provided. If the driver desires to use the vehicle accelerator, the driver moves the accelerator lever device 700 in the direction of the steering wheel 500. The movement of the accelerator lever device, in turn, moves the accelerator control cable, which, in turn, moves the vehicle accelerator pedal (not shown) and accelerates the vehicle. Likewise release of the accelerator lever device reduces the vehicle acceleration. In the second embodiment, the accelerator lever device 700 restrains the outer ring 410 of the ring assembly from rotating when the steering wheel moves the inner ring 430, the spline bearing, the spline shaft 200 and the vehicle steering shaft 100.

It should now be appreciated that the practice of the present invention provides for various embodiments of the control device for vehicle steering and braking 10 and the control device for vehicle steering, braking, and accelerator 20 each of which allows the driver of a vehicle, which also includes race cars as well as golf carts, to not only control the steering of the vehicle, but in addition, thereto, allows the driver to merely press on the steering wheel to control the braking operations and move an accelerator lever device to control the speed of the vehicle.

The preferred embodiments of the present invention disclosed herein have been discussed for the purpose of familiarizing the reader with the novel aspects of the invention. Although preferred embodiments of this invention have been shown, many changes, modifications, and substitutions may be made by one having ordinary skill in the art without departing from the scope and spirit of the invention as described in the following claims.

What is claimed is:

1. A control device for vehicle steering and braking for a vehicle having a steering shaft that is connected to the steering mechanism of the vehicle, said vehicle also having a steering wheel connected to steering mechanism and a brake pedal connected to a braking mechanism of the vehicle, said control device for vehicle steering and braking comprising:

a spline shaft having at least one outer spline tooth and at least one outer spline groove and further having a bottom end and an upper end wherein said bottom end of said spline shaft having spline shaft connecting means to the steering shaft and further said upper end of said spline shaft having a ring assembly connecting means;

a spline bearing having a first end and a second end and at least one inner spline tooth and at least one inner spline groove, wherein said upper end of said spline shaft is inserted into said first end of said spline bearing, and further that said second end having connecting means to said ring assembly, and further at least one friction reducing means is inserted between said at least one outer spline tooth of said spline shaft and said at least one inner spline tooth of said spline bearing;

a ring assembly further comprising said ring assembly connecting means of said spline shaft, said top end of said spline bearing, a spacer ring, a ring assembly bearing and an outer ring, and further said spacer ring has an upper surface wherein the steering wheel is connected to said upper surface of said spacer ring, and still further said outer ring having a bottom surface, a brake bearing means in contact with said bottom surface of said outer ring of said ring assembly, wherein said brake bearing means is held in contact with said outer ring of said ring assembly by a bearing cap and further said bearing cap has connecting means to a brake control rod and still further said brake control rod has connecting means to the brake pedal;

whereby applying a substantial axial force on said steering wheel in the direction of the steering column thereby applies a force to said ring assembly and further said outer ring of said ring assembly applies a force to said brake bearing means and further to said bearing cap and said brake control rod and thereby to the brake pedal further activating the braking device of the vehicle to slow or stop the vehicle; and wherein rotating the steering wheel connected to said spacer ring of said ring assembly, thereby rotates said spacer ring of said ring assembly and thereby further rotates said spline bearing and still further rotates said spline shaft and yet further rotates said steering shaft thereby controlling the steering of the vehicle.

2. The control device for vehicle steering and braking of claim 1, wherein said connecting means of said spline shaft and said steering shaft is said spline shaft is integral with said steering shaft.

3. The control device for vehicle steering and braking of claim 1, wherein said at least one friction reducing means inserted between said at least one outer spline tooth of said spline shaft and said at least one inner spline tooth of said spline bearing is a ball bearing.

4. The control device for vehicle steering and braking of claim 1, wherein said at least one friction reducing means inserted between said at least one outer spline tooth of said spline shaft and said at least one inner spline tooth of said spline bearing is a roller bearing.

5. The control device for vehicle steering and braking of claim 1, wherein said brake bearing means held in contact with said outer ring of said ring assembly is a ball bearing.

6. The control device for vehicle steering and braking of claim 1, wherein said bottom surface of said outer ring has a groove for receiving said brake bearing means.

7. A control device for vehicle steering, braking and accelerator for a vehicle having a steering shaft that is connected to the steering mechanism of the vehicle, said vehicle also having a steering wheel connected to steering mechanism, an accelerator pedal connected to an acceleration mechanism of the vehicle and a brake pedal connected to a braking mechanism of the vehicle, said control device for vehicle steering, acceleration, and braking comprising:

a spline shaft having at least one outer spline tooth and at least one outer spline groove and further having a bottom end and an upper end wherein said bottom end of said spline shaft having spline shaft connecting means to said steering shaft and further said upper end of said spline shaft having a ring assembly connecting means;

a spline bearing having a first end and a second end and at least one inner spline tooth and at least one inner spline groove, wherein said upper end of said spline shaft is inserted into said first end of said spline bearing, and further that said second end having connecting means to said ring assembly, and further at least one friction reducing means is inserted between said at least one outer spline tooth of said spline shaft and said at least one inner spline tooth of said spline bearing;

a ring assembly further comprising said ring assembly connecting means of said spline shaft, said top end of said spline bearing, a spacer ring, a ring assembly bearing and an outer ring, and further said spacer ring has an upper surface wherein the steering wheel is connected to said upper surface of said spacer ring, and still further said outer ring having a bottom surface;

an accelerator lever device having a lever device connector means to said outer ring of said ring assembly, said accelerator lever device further having a accelerator control cable and further said accelerator cable having connecting means to the accelerator pedal, whereby movement of the accelerator lever device activates the accelerator pedal and thereby controls the speed of the vehicle;

a brake bearing means in contact with said bottom surface of said outer ring of said ring assembly, wherein said brake bearing means is held in contact with said outer ring of said ring assembly by a bearing cap and further said bearing cap has connecting means to a brake control rod and still further said brake control rod has connecting means to the brake pedal;

whereby applying a substantial axial force on said steering wheel in the direction of the steering column thereby applies a force to said ring assembly and further said outer ring of said ring assembly applies a force to said brake bearing means and further to said bearing cap and said brake control rod and thereby to the brake pedal further activating the braking system of the vehicle to slow or stop the vehicle; and wherein rotating the steering wheel connected to said spacer ring of said ring assembly, thereby rotates said shaft ring of said ring assembly and thereby further rotates said spline bearing and still further rotates said spline shaft and yet further rotates said steering shaft thereby controlling the steering of the vehicle.

8. The control device for vehicle steering, braking and accelerator of claim 7, wherein said connecting means of said spline shaft and said steering shaft is said spline shaft is integral with said steering shaft.

9. The control device for vehicle steering, braking and accelerator of claim 7, wherein said at least one friction reducing means inserted between said at least one outer spline tooth of said spline shaft and said at least one inner spline tooth of said spline bearing is a ball bearing.

10. The control device for vehicle steering, braking and accelerator of claim 7, wherein said at least one friction reducing means inserted between said at least one outer spline tooth of said spline shaft and said at least one inner spline tooth of said spline bearing is a roller bearing.

11. The control device for vehicle steering, braking and accelerator of claim 7, wherein said brake bearing means held in contact with said outer ring of said ring assembly is a ball bearing.

12. The control device for vehicle steering, braking and accelerator of claim 7, wherein said bottom surface of said outer ring has a groove for receiving said brake bearing means.

* * * * *